(12) United States Patent
Chen

(10) Patent No.: US 10,193,290 B2
(45) Date of Patent: Jan. 29, 2019

(54) BATTERY COMPARTMENT AND ELECTRONIC CIGARETTE HAVING SAME

(71) Applicant: SHENZHEN IVPS TECHNOLOGY CO., LTD., Shenzhen, Guangdong Province (CN)

(72) Inventor: Wen Chen, Shenzhen (CN)

(73) Assignee: SHENZHEN IVPS TECHNOLOGY CO., LTD. (CN)

(*) Notice: Subject to any disclaimer, the term of this patent is extended or adjusted under 35 U.S.C. 154(b) by 0 days.

(21) Appl. No.: 15/867,692

(22) Filed: Jan. 11, 2018

(65) Prior Publication Data
US 2018/0166841 A1    Jun. 14, 2018

(30) Foreign Application Priority Data

Nov. 11, 2016 (CN) .................... 2016 2 1220389 U

(51) Int. Cl.

| H01R 13/62 | (2006.01) |
|---|---|
| H01R 33/955 | (2006.01) |
| H01R 33/05 | (2006.01) |
| H01M 2/10 | (2006.01) |
| A24F 47/00 | (2006.01) |

(52) U.S. Cl.
CPC ......... *H01R 33/955* (2013.01); *A24F 47/002* (2013.01); *H01M 2/1022* (2013.01); *H01R 33/05* (2013.01); *A24F 47/008* (2013.01); *H01M 2220/30* (2013.01)

(58) Field of Classification Search
CPC ..... H01R 33/955; H01R 33/05; A24F 47/008; A24F 47/002; H01M 2/1022; H01M 2220/30; H04M 1/23; G06F 1/1626; G08B 13/1681; F21L 4/005

USPC ........................................ 439/366
See application file for complete search history.

(56) References Cited

U.S. PATENT DOCUMENTS

| 3,798,440 A * | 3/1974 | Brindley | ................. F21L 4/005 |
|---|---|---|---|
| | | | 200/60 |
| 3,882,445 A * | 5/1975 | Hamilton | ........... G08B 13/1681 |
| | | | 340/541 |
| 4,068,095 A * | 1/1978 | Ghormley | ............. G06F 1/1626 |
| | | | 379/444 |
| 2004/0141313 A1 * | 7/2004 | Elsener | .................... B25F 1/04 |
| | | | 362/119 |

(Continued)

*Primary Examiner* — Jean F Duverne
(74) *Attorney, Agent, or Firm* — IP-PAL Patent US

(57) ABSTRACT

The present disclosure provides a battery compartment. The battery compartment includes a support, a button covering the support, and a switch button accommodated in the support. The support defines a mounting hole and at least one locating hole. The support further defines a through hole on two lateral surfaces thereof respectively. The switch button directly faces the mounting hole. The battery compartment further includes an elastic element and a revolving shaft. The elastic element has one end abutted against a surface of the button facing the support, and the other end passing through the mounting hole to be abutted against the switch button. The button is provided with at least one connector assembly. The connector assembly defines a second through hole thereon. The connector assembly is configured to be inserted into the locating hole. The revolving shaft passes through the first through hole and the second through hole.

19 Claims, 7 Drawing Sheets

(56) References Cited

U.S. PATENT DOCUMENTS

2017/0043336 A1*  2/2017  Khattak ............... B01L 3/5027
2018/0213072 A1*  7/2018  Shi ......................... H04M 1/23

* cited by examiner

BATTERY COMPARTMENT AND ELECTRONIC CIGARETTE HAVING SAME

CROSS REFERENCE TO RELATED APPLICATIONS

The present application claims priority to Chinese Patent Application CN 201621220389.1 filed on Nov. 11, 2016.

TECHNICAL FIELD

The present disclosure relates to a battery compartment and an electronic cigarette having the same battery compartment.

BACKGROUND

Smoking is harmful to health. At present, all countries of the world are vigorously promoting tobacco-free campaigns. Electronic cigarette, also called simulating cigarette, has the same appearance as conventional cigarettes and the similar flavor to conventional cigarettes, even has many more flavors than conventional cigarettes. The electronic cigarette also can create aerosols, flavors and a feeling of smoking, like conventional cigarettes. However, the electronic cigarette has no harmful ingredients such as tar and particulate matter existing in conventional cigarettes, and forms no second hand smoke filling in air. The electronic cigarette can effectively eliminate the harmful substances produced during conventional smoking, and can give a feeling of smell the same as conventional smoking to users. Therefore, the electronic cigarette is mainly used for quitting smoking and substituting conventional cigarettes, and it plays a great role in the promotion of tobacco-free campaigns. Current electronic cigarettes include a battery compartment. The battery compartment is mounted with a button. At present, most buttons available on the market are designed as small buttons, on which there is only one specific point to be pressed. When the button is used, there might be problems that the button needs to be looked for, the button is unsmooth to use and is uncomfortable to use. Moreover, electronic buttons on conventional PCBs all select metal dome structured electronic buttons with a travel of 0.2 millimeters to 0.3 millimeters. Since the travel is too short, the use feel of the button is poor, the button is easy to damage and fail, and the button sound is big. Conventional electronic buttons all are designed to be pressed vertically, so that the button is stressed at one point. Thus, the button is easy to damage and the button has short service life.

Smoking is harmful to health. At present, all countries of the world are vigorously promoting tobacco-free campaigns. Electronic cigarette, also called simulating cigarette, has the same appearance as conventional cigarettes and the similar flavor to conventional cigarettes, even has many more flavors than conventional cigarettes. The electronic cigarette also can create aerosols, flavors and a feeling of smoking, like conventional cigarettes. However, the electronic cigarette has no harmful ingredients such as tar and particulate matter existing in conventional cigarettes, and forms no second hand smoke filling in air. The electronic cigarette can effectively eliminate the harmful substances produced during conventional smoking, and can give a feeling of smell the same as conventional smoking to users. Therefore, the electronic cigarette is mainly used for quitting smoking and substituting conventional cigarettes, and it plays a great role in the promotion of tobacco-free campaigns. Current electronic cigarettes mainly include a battery compartment. Present battery compartments have a big button provided thereon. Generally, a revolving shaft is inserted to fix one end of the big button, so that the other end of the big button rotates around the revolving shaft. The big button can be pressed to realize associated functions. In order to facilitate portability, electronic products all are tending to become smaller in size. As a result, the current design of big button is easy to lead to an increasingly smaller space of the battery compartment during the installation process. If the button function is still realized by employing the traditional structure of inserting a shaft, the big button can only be installed by increasing the size of the battery compartment; thus, the battery compartment is inconvenient to carry.

SUMMARY

The present disclosure mainly aims to provide a battery compartment, so as to improve the use feel of the button and prolong the service life of the button.

In order to achieve the above aim, the battery compartment provided by the present disclosure includes a support, a button covering the support, and a switch button accommodated in the support.

The support defines a mounting hole and at least one locating hole. The support further defines a first through hole on two lateral surfaces thereof respectively. The switch button directly faces the mounting hole.

The battery compartment further includes an elastic element and a revolving shaft. The elastic element has one end abutted against a surface of the button facing the support, and the other end passing through the mounting hole to be abutted against the switch button.

The button is provided with at least one connector assembly. The connector assembly defines a second through hole thereon. The connector assembly is configured to be inserted into the locating hole. The revolving shaft is configured for passing through the first through hole and the second through hole.

Preferably, the surface of the button facing the support is provided with a fixing column, and one end of the elastic element is sleeved on the fixing column.

Preferably, the switch button includes a base and an end cap connected to the base, and the elastic element is partially sleeved on the end cap and is abutted against the base.

Preferably, the button is provided with a support block, the support defines an insert groove, and the support block is accommodated in the insert groove.

Preferably, the elastic element is a spring or silicone gasket.

Preferably, the battery compartment further includes a Printed Circuit Board (PCB), the switch button is fixed on the PCB, the PCB defines a plurality of fixing holes, the support defines a plurality of connecting holes correspondingly, and a connecting piece is configured for passing through the connecting hole and the fixing hole.

Preferably, the revolving shaft is provided with a fixing terminal at two ends thereof respectively, the fixing terminal has a cross sectional area greater than that of the first through hole, and the two fixing terminals are configured to be exposed out of the first through hole and abutted against two exterior surfaces of the support.

Preferably, the battery compartment further includes a battery, and the battery is configured to be connected to the PCB.

Preferably, the PCB is further provided with a charge interface, the support further defines a recess, and the charge interface is accommodated in the recess.

The present disclosure further provides an electronic cigarette. The electronic cigarette includes the battery compartment described above.

The technical scheme of the present disclosure employs a big button structure. The increase of the entire stress area of the button can improve the use feel of the button. The structure of revolving shaft inside the button can reduce the strength for pressing the button. The arrangement of the elastic element inside the button increases the travel of the button, so that the button is pressed more comfortably and the strength for pressing the button is reduced when the button is used. Therefore, the service life of the button is prolonged.

The present disclosure mainly aims to provide a battery compartment, so as to improve the flexibility of installation and facilitate portability.

In order to achieve the above aim, the battery compartment provided by the present disclosure includes a support, a housing sleeved on the support, a Printed Circuit Board (PCB) accommodated in the support, and a switch button covering the housing. The switch button is provided with a revolving shaft and a connector clip at two ends thereof respectively. The support is provided with a connecting piece configured for accommodating the revolving shaft. The connector clip is configured for passing through the support to be connected to the PCB.

Preferably, the connecting piece includes a groove, and stop blocks arranged at two sides of the groove respectively; the revolving shaft is accommodated in the groove; and the stop block is configured for supporting the switch button.

Preferably, the revolving shaft and the groove are in interference-fit connection.

Preferably, the support defines a clamping hole, the PCB is provided with a switch button, the connector clip is configured for passing the clamping hole to be connected to the switch button.

Preferably, the battery compartment is further provided with at least one elastic element, and the elastic element has one connected to the switch button and the other end abutted against the support.

Preferably, the switch button is provided with a protruding part, and one end of the elastic element is sleeved on the protruding part.

Preferably, the elastic element is a spring or silicone pad.

Preferably, the switch button is provided with at least two wedge blocks on the end provided with the revolving shaft, and the wedge block is accommodated in the housing.

Preferably, each wedge block includes a first surface in connection with the housing, the switch button includes a second surface far away from the support, and the first surface and the second surface are arranged in such a manner that an included angle is formed between the extended lines of their longitudinal sectioning lines.

The present disclosure further provides an electronic cigarette. The electronic cigarette includes the battery compartment described above.

According to the technical scheme of the present disclosure, the switch button is provided with the revolving shaft and the connector clip at two ends thereof respectively; the revolving shaft is in moveable connection with the support, and the connector clip is abutted against the PCB, so that the switch button is easy to install, the space for installation of the switch button is saved, the size of the battery compartment is reduced and the portability is facilitated.

BRIEF DESCRIPTION OF THE DRAWINGS

For a better understanding of the embodiments of the present disclosure or the technical scheme in the prior art, accompanying drawings needed in the description of the embodiments or the prior art are simply illustrated below. Obviously, the accompanying drawings described below are some embodiments of the present disclosure. For the ordinary skill in the field, other accompanying drawings may be obtained according to the structure shown in these accompanying drawings without creative work.

DESCRIPTION OF REFERENCE NUMBERS

Figure 1:
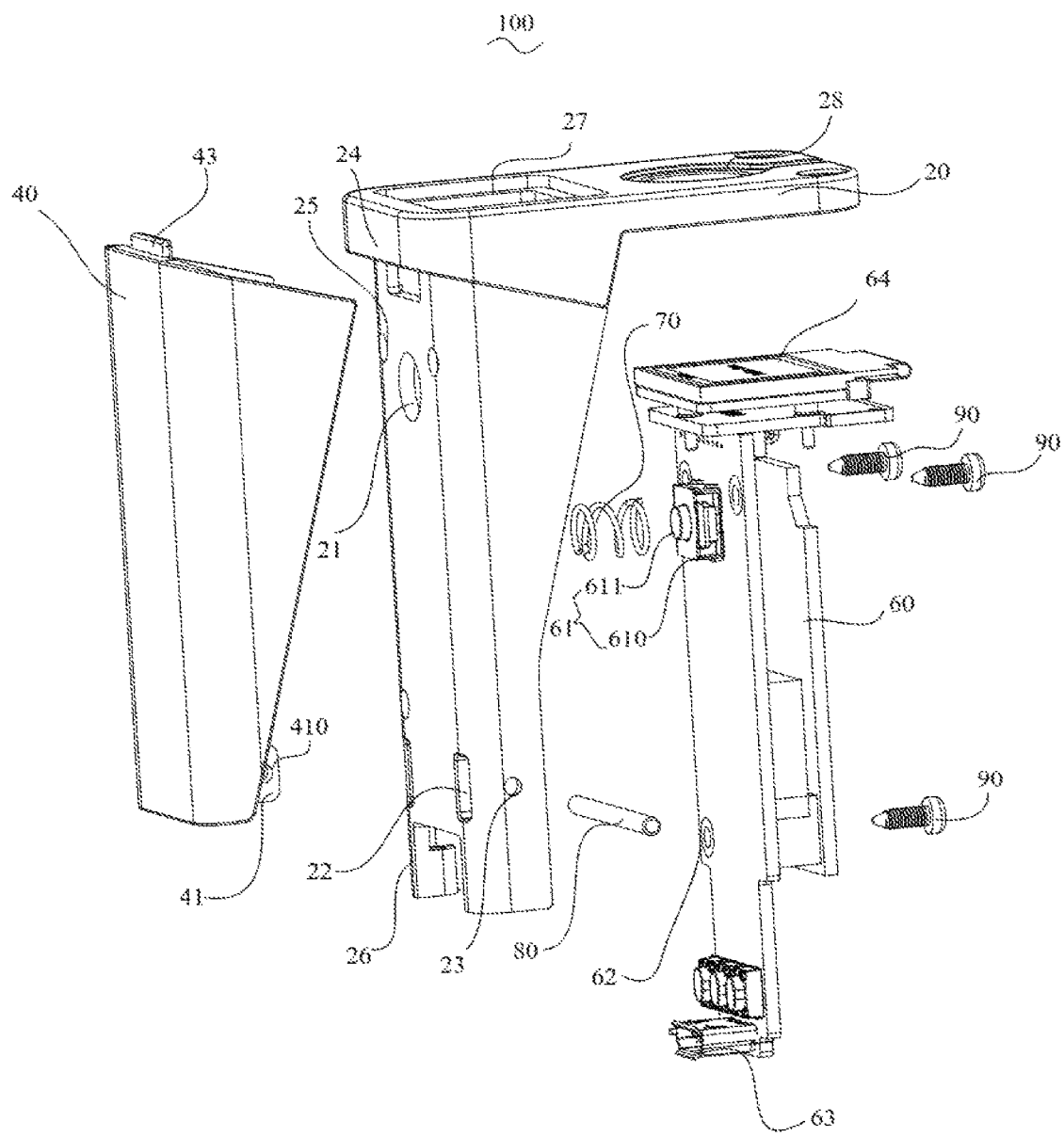
FIG. 1 is an exploded view of a battery compartment according to an embodiment of the present disclosure.

| Reference number | Part | Reference number | Part |
|---|---|---|---|
| 100 | Battery compartment | 42 | Fixing column |
| 20 | Support | 43 | Support block |
| 21 | Mounting hole | 60 | PCB |
| 22 | Locating hole | 61 | Switch button |
| 23 | First through hole | 610 | Base |
| 24 | Insert groove | 611 | End cap |
| 25 | Connecting hole | 62 | Fixing hole |
| 26 | Recess | 63 | Charge interface |
| 27 | Opening | 64 | Display screen |
| 28 | Connecting hole | 70 | Elastic element |
| 40 | Button | 80 | Revolving shaft |
| 41 | Connector assembly | 81 | Fixing terminal |
| 410 | Second through hole | 90 | Connecting rod |
| 100a | Battery compartment | 70a | Switch button |
| 10 | Housing | 700 | Protruding part |
| 30 | Support | 701 | Second surface |
| 31 | Connecting piece | 71 | Revolving shaft |
| 310 | Groove | 72 | Connector clip |
| 311 | Stop block | 73 | Elastic element |
| 32 | Clamping hole | 74 | Wedge block |
| 50 | PCB | 740 | First surface |
| 51 | Switch button | | |

The implementation of aims, the function features and the advantages of the present disclosure are described below in further detail in conjunction with embodiments with reference to the drawings.

DETAILED DESCRIPTION

A clear and complete description as below is provided for the technical scheme in the embodiments of the present disclosure in conjunction with the drawings in the embodiments of the present disclosure. Obviously, the embodiments described hereinafter are simply part embodiments of the present disclosure, but all the embodiments. All other embodiments obtained by the ordinary skill in the art based on the embodiments in the present disclosure without creative work are intended to be included in the scope of protection of the present disclosure.

It should be noted that all directional indications (such as top, bottom, left, right, front, behind . . . ) in the embodiments of the present disclosure are merely to illustrate a relative position relation, a relative motion condition, etc. between each part in a certain state (for example, the state shown in the drawings). If the state changes, the directional indication changes accordingly.

In the present disclosure, unless otherwise specifically stated and defined, terms "connected", "fixed", etc. should be interpreted expansively. For example, "fixed" may be fixed connection, also may be detachable connection, or integration; may be mechanical connection, also may be electrical connection; may be direct connection, also may be indirect connection through an intermediate, and may be internal communication between two elements or interaction of two elements, unless otherwise specifically defined. The ordinary skill in this field can understand the specific implication of the above terms in the present disclosure according to specific conditions.

In addition, if terms "first", "second", etc. appear in the present disclosure, they are merely for the purpose of description, but cannot be understood as the indication or implication of relative importance or as the implicit indication of the number of the designated technical features; therefore, features defined by "first" and "second" may specifically or implicitly include at least one such feature. In addition, technical schemes of each embodiment of the present disclosure may be combined mutually; however, this must be carried out on the basis that the ordinary skill in this field can implement the combination. When the combination of technical schemes has a conflict or cannot be implemented, it should be considered that such combination of technical schemes does not exist and is not in the scope of protection claimed by the present disclosure.

The present disclosure provides a battery compartment 100. The battery compartment 100 is arranged on the electronic cigarette and is configured for supplying power to the electronic cigarette and serving as a start switch of the electronic cigarette.

Figure 2:
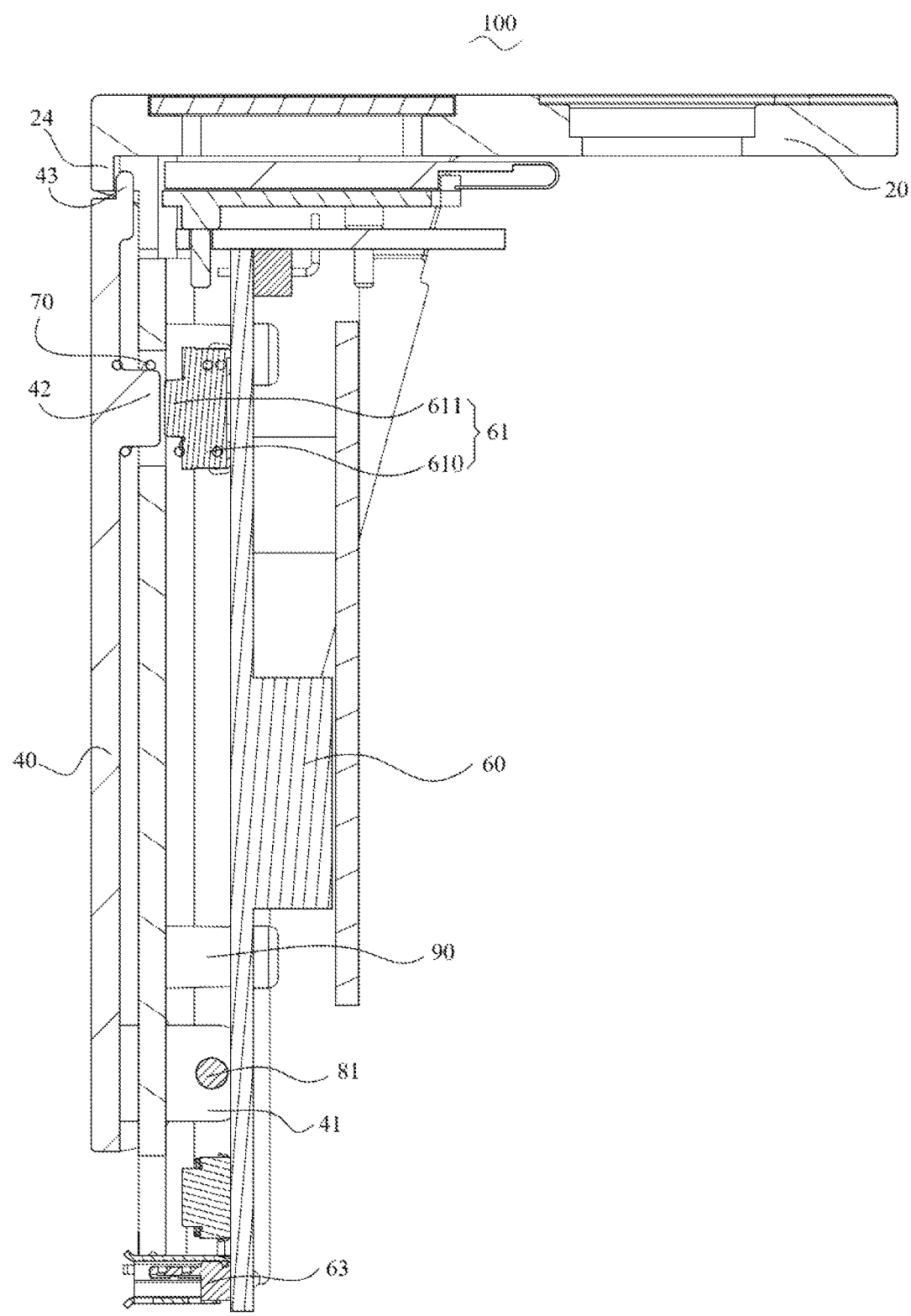
FIG. 2 is a cross-sectional view of a complete assembly of the battery compartment shown in FIG. 1.

Referring to FIG. 1 and FIG. 2, in an embodiment of the present disclosure, the battery compartment 100 includes a support 20, a button 40 covering the support 20, and a switch button 61 accommodated in the support 20. The support 20 defines a mounting hole 21 and at least one locating hole 22. The support 20 further defines a through hole 23 on two lateral surfaces thereof respectively. The switch button 61 is configured for directly facing the mounting hole 21. The battery compartment 100 further includes an elastic element 70 and a revolving shaft 80. The elastic element 70 has one end abutted against a surface of the button 40 facing the support 20, and the other end passing through the mounting hole 21 to be abutted against the switch button 61. The button 40 is provided with at least one connector assembly 41. The connector assembly 41 defines a second through hole 410 thereon. The connector assembly 41 is configured to be inserted into the locating hole 22. The revolving shaft 80 is configured for passing through the first through hole 23 and the second through hole 410, so as to connect the support 20 and the button 40 together.

Specifically, the battery compartment 100 further includes a battery and a PCB 60. The switch button 61 is fixed on the PCB 60. The battery is connected to the PCB 60. The PCB 60 is further provided with a charge interface 63 and a display screen 64. The support 20 further defines a recess 26 and an opening 27. The charge interface 63 is accommodated in the recess 26. The display screen 64 is accommodated in the opening 27. The display screen 64 is configured for displaying the battery level of the battery, so that the battery compartment 100 can be charged in time. The battery compartment 100 can be continuously charged and repeatedly used. When an external force is applied to one end of the button 40 far away from the revolving shaft, the elastic element 70 is compressed under the action of the force, and the button 40 moves in the direction proximate to the PCB 60 along the revolving shaft 80 and triggers the switch button 61 to start ignition. When the external force is removed, the elastic element 70 and the switch button 61 are restored to the original position under the action of a resilience force, and the button 40 moves in the direction far away from the PCB 60 along the revolving shaft 80 to shut down ignition. In the present embodiment, preferably, the number of the connector assembly 41 is two and the number of the locating hole 22 is two too. The elastic element 70 is a spring or silicone gasket. In the present embodiment, the elastic element 70 is a spring preferably.

The battery compartment 100 of the present disclosure employs a revolving shaft type structure internally, which can reduce the strength for pressing the button and improve the service life of the electronic button. The arrangement of the elastic element 70 inside the button 40 increases the travel of the button indirectly and thus improves the use feel of the button.

Referring to FIG. 2, in order to make the structure of the battery compartment 100 firmer and prevent the elastic element 70 swinging under the action of an external force, the surface of the button 40 facing the support 20 is provided with a fixing column 42, and one end of the elastic element 70 is sleeved on the fixing column 42.

Figure 3:
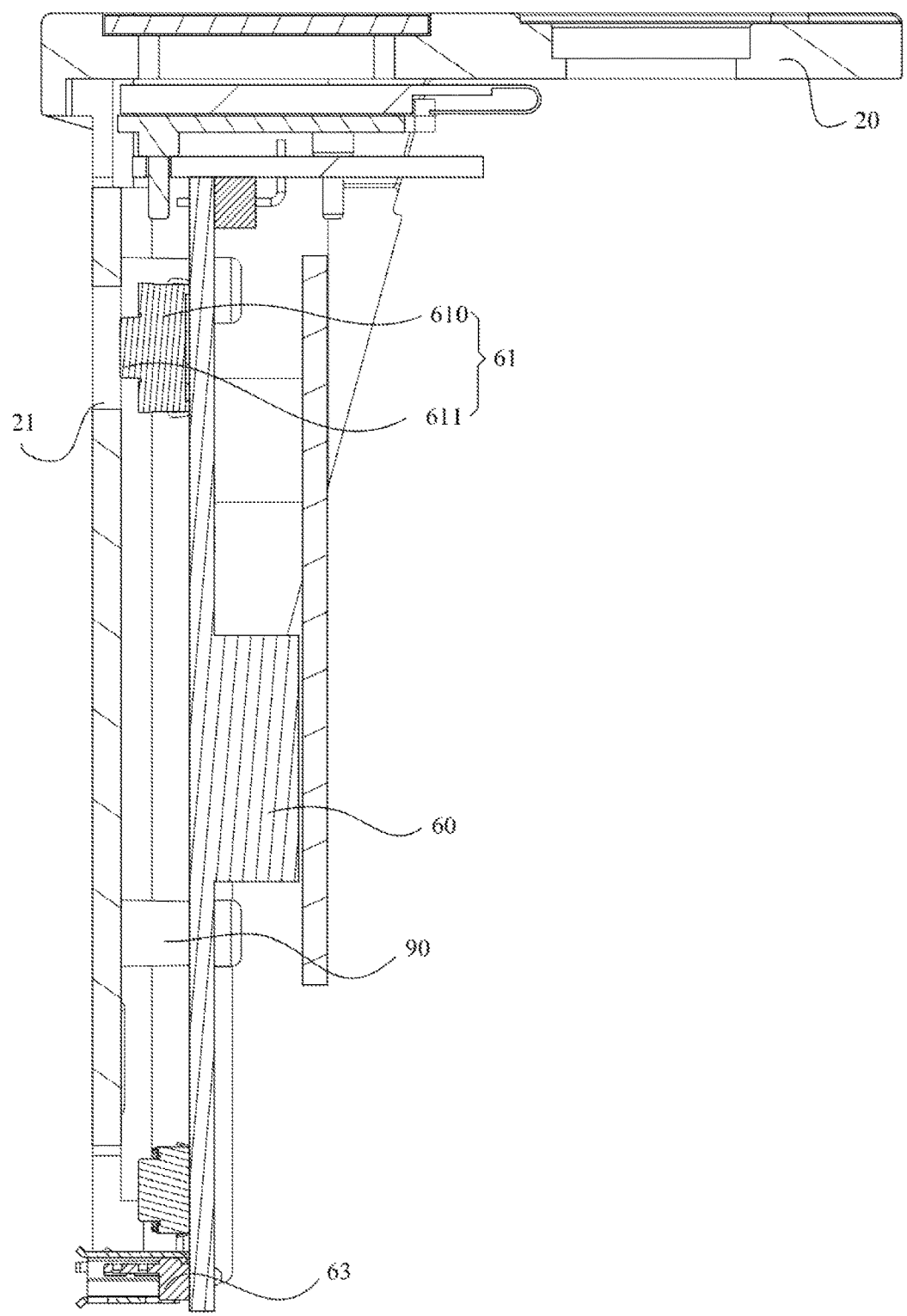
FIG. 3 is a cross-sectional view of a complete assembly of a support and a PCB shown in FIG. 2.
Figure 4:
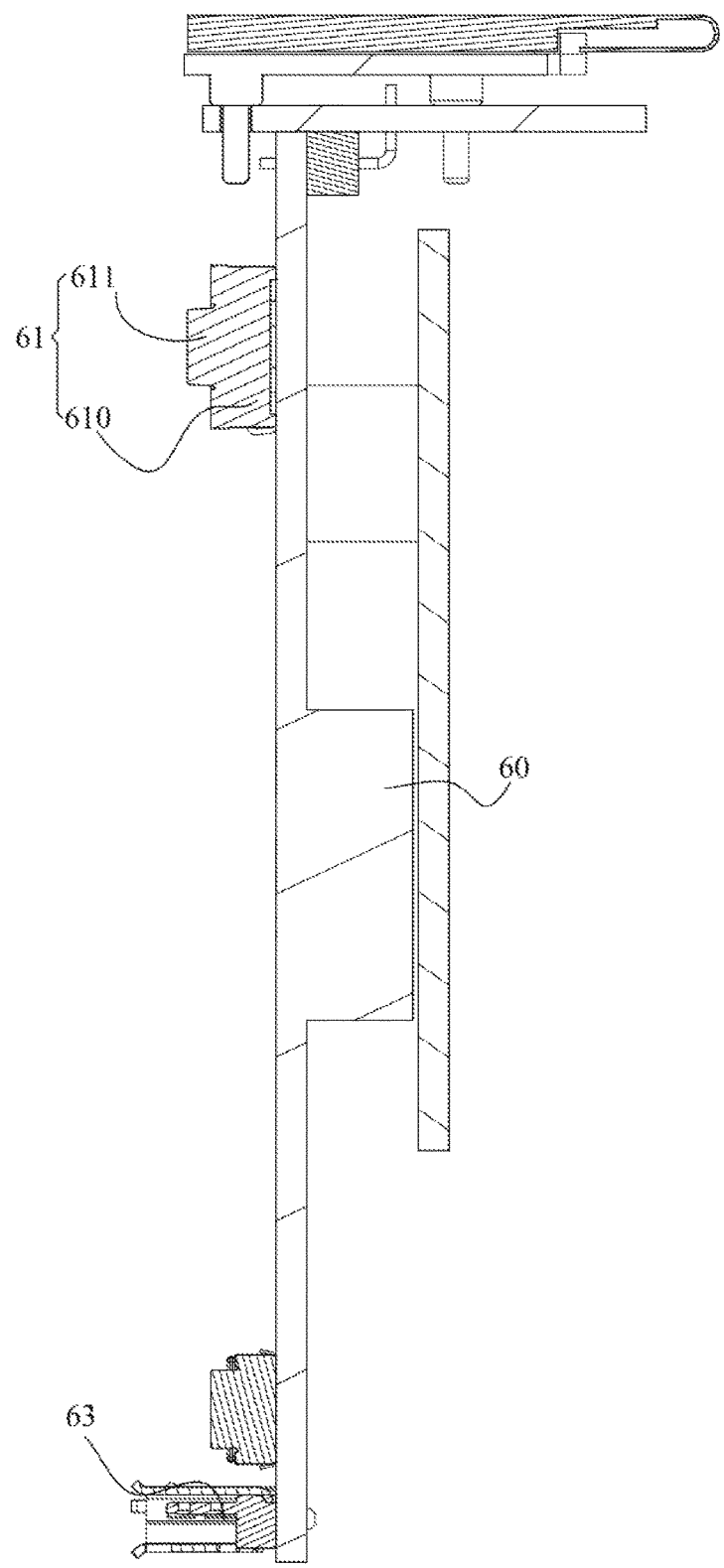
FIG. 4 is a cross-sectional view of a PCB shown in FIG. 2.

Referring to FIG. 3 and FIG. 4, the switch button 61 includes a base 610 and an end cap 611 connected to the base 610, and the elastic element 70 is partially sleeved on the end cap 611 and is abutted against the base 610. The elastic element 70 and the switch button 61 are connected more firmly, and the stress area is even. The switch button 61 is stressed from the contact of surfaces and is not subjected to the acting force from one same stress point constantly. The service life of the switch button 61 is prolonged.

Further, in order to prevent relative motion between the button 40 and the support 20, the button 40 is provided with a support block 43, the support 20 defines an insert groove 24, and the support block 43 is accommodated in the insert groove 24.

Further, in order to make the PCB 60 and the support 20 connected more firmly, the PCB 60 defines a plurality of fixing holes 62, the support 20 defines a plurality of connecting holes 25 correspondingly, and a connecting piece 90 is configured for passing through the connecting hole 25 and the fixing hole 62, so as to connect the PCB 60 and the support 20 together.

Further, the revolving shaft 80 is provided with a fixing terminal 81 at two ends thereof respectively, the fixing terminal 81 has a cross sectional area greater than that of the first through hole 23, and the two fixing terminals 81 are configured to be exposed out of the first through hole 23 and abutted against two exterior surfaces of the support 20. The fixing terminals 81 are arranged at two ends of the revolving shaft 80, preventing that the revolving shaft 80 is disengaged from the first through hole 23 to impact the use of the battery compartment 100 during the usage process.

The present disclosure further provides an electronic cigarette. The electronic cigarette includes the battery compartment 100 described above. The specific structure of the battery compartment 100 can be referred to the above embodiments. Since the battery compartment 100 of the electronic cigarette employs all technical schemes of the above embodiments, the electronic cigarette at least has all the beneficial effects brought by the technical schemes of the above embodiments. No further description is needed here.

The electronic cigarette further includes an atomizer (not shown in the drawings), and a mouthpiece connected to the atomizer (not shown in the drawings). The atomizer is connected to the battery compartment 100. The support 20 defines a connecting hole 28. The atomizer is accommodated in the connecting hole 28. The atomizer is configured for generating an aerosol by starting ignition through the switch button 40. The user inhales the aerosol through the mouthpiece to simulate a feeling of tobacco smoking.

The button employed by the present disclosure is designed as a big button, which provides an acting surface having big area. The elastic element is arranged inside the button, so that the button is comfortable to use and has a good use feel. The button employs revolving shaft type assembly internally. When in use, the press force is always vertical to the external button. The switch button on the PCB is not subjected to the vertical acting force from one same direction constantly. The strength for pressing the switch button is reduced when the button is used and the service life of the switch button is prolonged.

Figure 5:
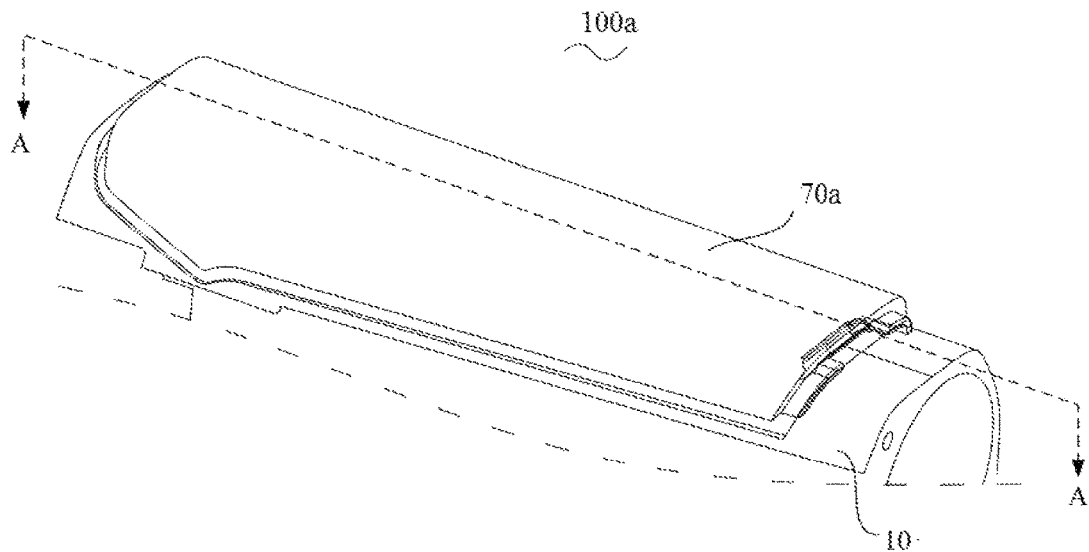
FIG. 5 is a partial structure diagram of a battery compartment according to an embodiment of the present disclosure.
Figure 6:
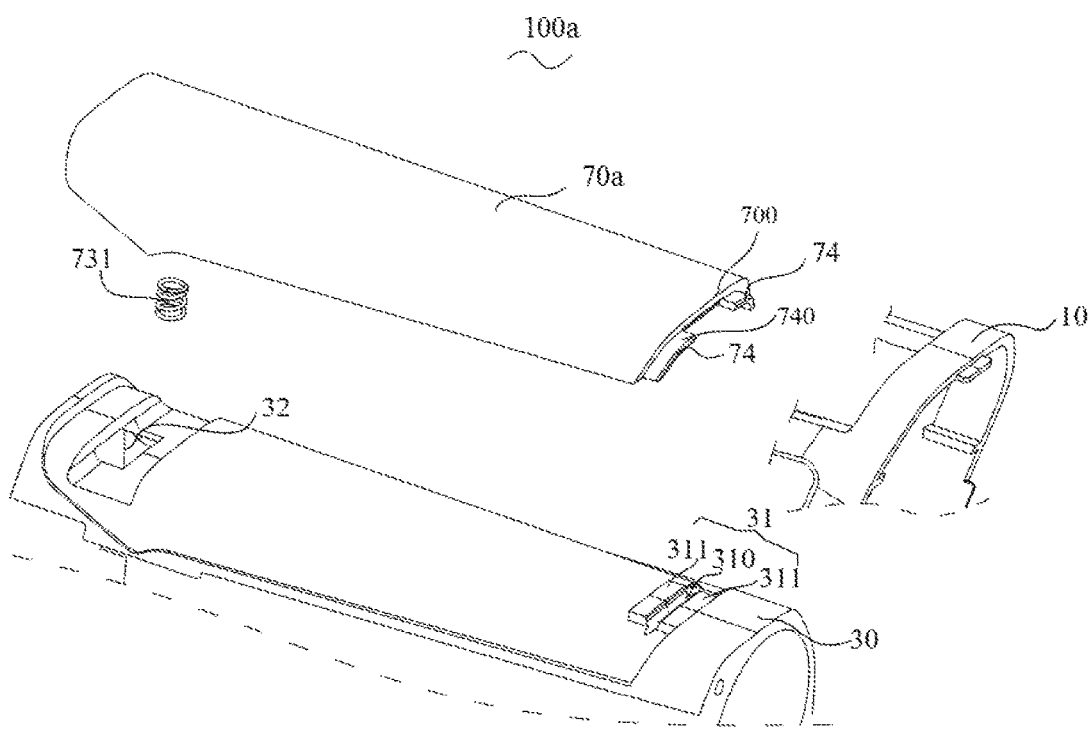
FIG. 6 is an exploded view of the battery compartment shown in FIG. 5.
Figure 7:
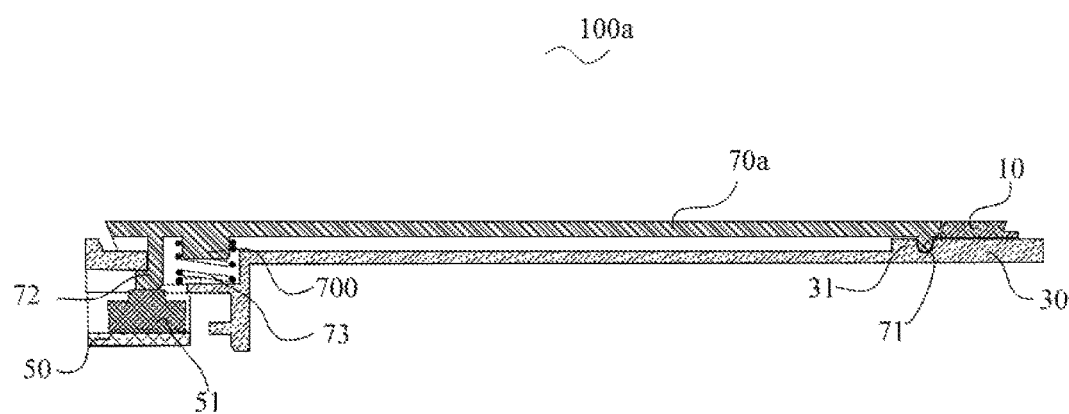
FIG. 7 is cross-sectional view of the battery compartment along line A-A shown in FIG. 5.

Referring to FIG. 5 to FIG. 7, in an embodiment of the present disclosure, the battery compartment 100a includes a support 30, a housing 10 sleeved on the support 30, a PCB 50 accommodated in the support 30, and a switch button 70a covering the housing 10. The switch button 70a is provided with a revolving shaft 71 and a connector clip 72 at two ends thereof respectively. The support 30 is provided with a connecting piece 31 configured for accommodating the revolving shaft 71. The connector clip 72 is configured for passing through the support 30 to be connected to the PCB 50.

Specifically, in order to realize the function that the battery compartment 100a supplies power, the battery compartment 100a is provided with a battery (not shown in the drawings) internally. The battery is connected to the PCB 50. In order to enhance the firmness of the entirety of the battery compartment 100a, the support 30 defines a clamping hole 32, the PCB 50 is provided with a switch button 51, and the connector clip 72 is configured for passing the clamping hole 32 to be connected to the switch button 51. When an external force is applied to the end of the switch button 70a provided with the connector clip 72, the revolving shaft 71 on the switch button 70a moves downwards in the direction proximate to the PCB 50 along the connecting piece 31, and the connector clip 72 triggers the switch button 51 to start ignition. When the external force is removed, the revolving shaft 71 on the switch button 70a moves upwards in the direction far away from the PCB 50 along the connecting piece 31, and the switch button 51 is restored to the original position to shut down ignition under the action of a resilience force.

In the present disclosure, the switch button of the battery compartment 100a has the revolving shaft and the connector clip connected to the support and the PCB respectively. The battery compartment is simple in structure, has size reduced and space saved, and is convenient to carry.

Figure 8:
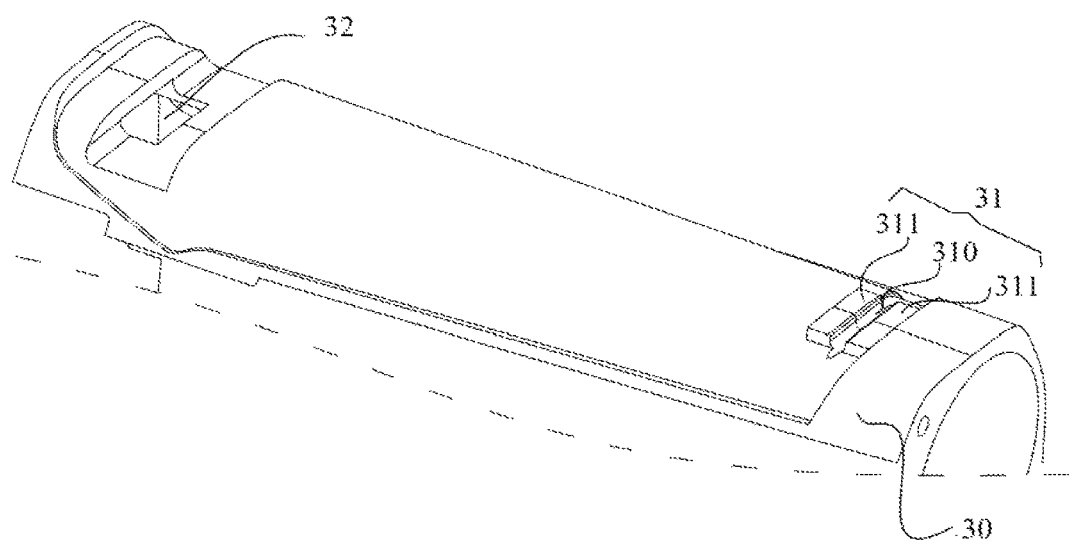
FIG. 8 is a structure diagram of a support shown in FIG. 5.
Figure 9:
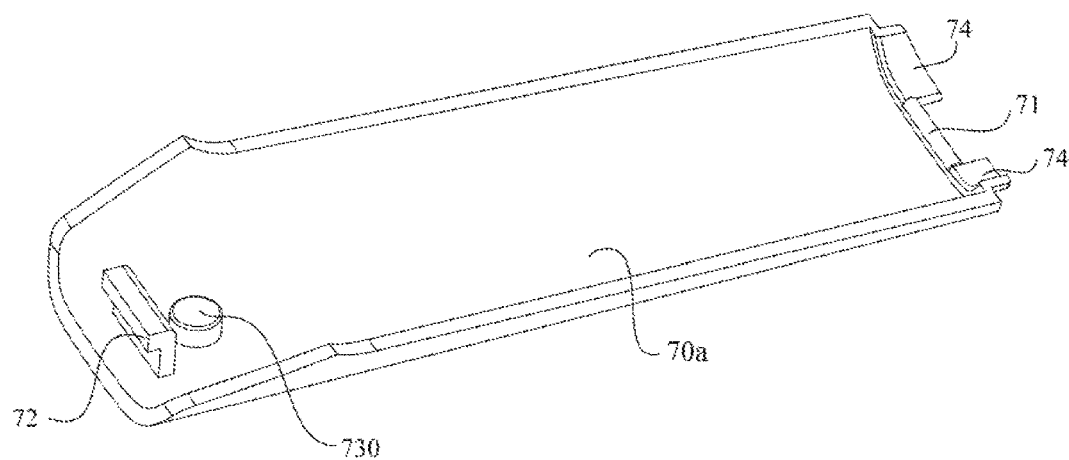
FIG. 9 is a perspective view of a switch button shown in FIG. 5.

Referring to FIG. 8 and FIG. 9, in order to facilitate the installation of the switch button 70a and the support 30, the connecting piece 31 includes a groove 310 and stop blocks 311 arranged at two sides of the groove 310 respectively; the revolving shaft 71 is accommodated in the groove 310; and the stop block 311 is configured for supporting the switch button 70a. The revolving shaft 71 and the groove 310 are in interference-fit connection. The revolving shaft 71 moves up and down in the direction proximate to the PCB 50 along the connecting piece 31. Since the revolving shaft 71 moves many times, the stop block 311 can achieve the effect of supporting the switch button 70a, so that the service life of the switch button 70a can be prolonged.

Further, the battery compartment 100a is further provided with at least one elastic element 73, and the elastic element 73 has one connected to the switch button 70a and the other end abutted against the support 30. The switch button 70a is provided with a protruding part 700, and one end of the elastic element 73 is sleeved on the protruding part 700. The elastic element 73 is a spring or silicone pad. In order to improve the hand feeling of the user pressing the switch button 70a and to improve the user experience, the switch button 70a is further provided with at least one elastic element 73. Preferably, the switch button 70a is provided with one elastic element 73 in the present embodiment. The elastic element 73 is a spring. The elastic element 73 can also be rubber materials having high elasticity, such as natural rubber, styrene butadiene rubber, chloroprene rubber, etc.

Figure 10:
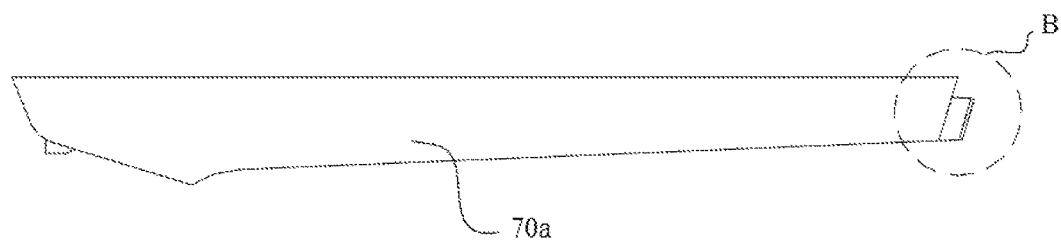
FIG. 10 is a side view of the switch button shown in FIG. 9.
Figure 11:
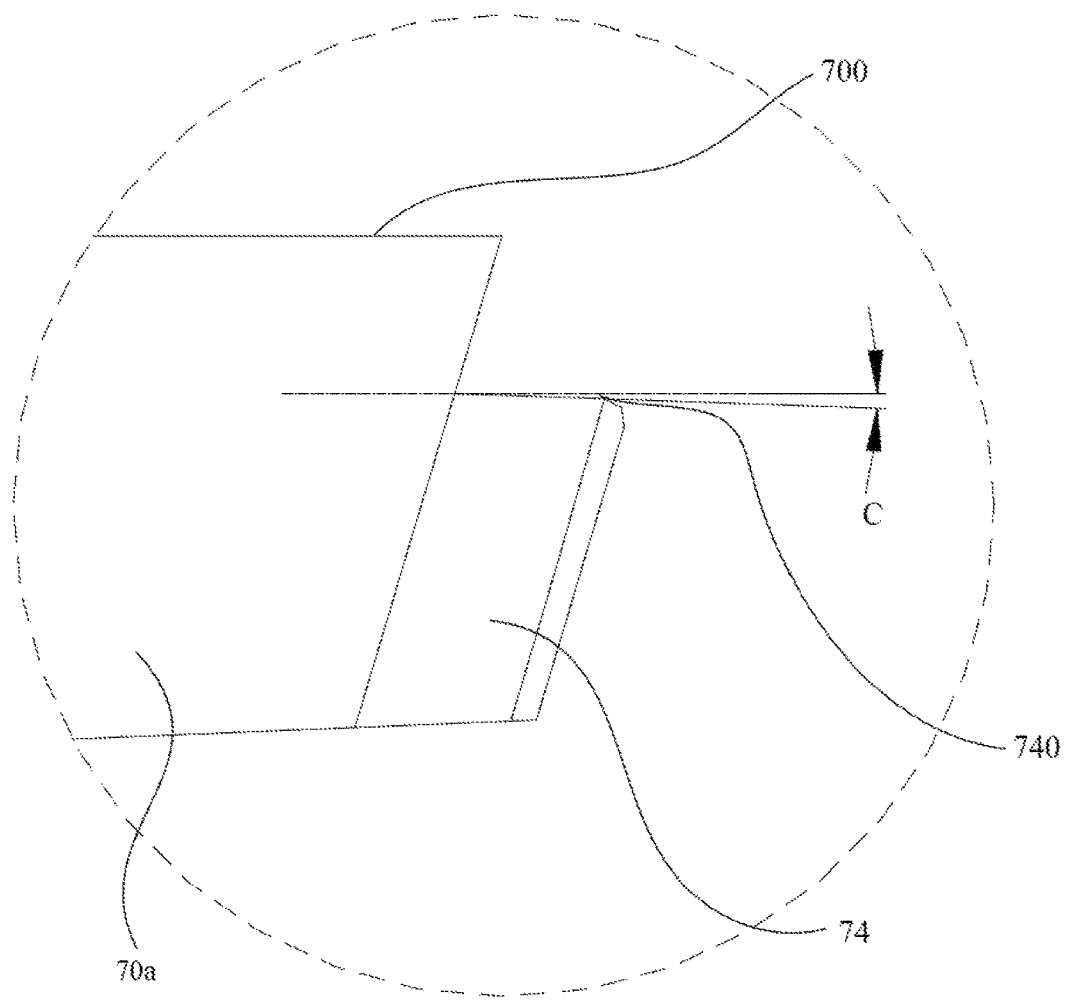
FIG. 11 is an enlarged view of part B of the switch button shown in FIG. 10.

Referring to FIG. 6, FIG. 10 and FIG. 11, in order to improve the use comfort of the switch button 70a and prolong the service life of the switch button 70a, the switch button 70a is provided with two wedge blocks 74 on the end provided with the revolving shaft 71, and the wedge block 74 is accommodated in the housing 10. Each wedge block 74 includes a first surface 740 in connection with the housing 10, the switch button 70a includes a second surface 701 far away from the support 30, and the first surface 740 and the second surface 701 are arranged in such a manner that an included angle is formed between the extended lines of their longitudinal sectioning lines. When the switch button 70a is pressed by an external force, the first surface 740 and the second surface 701 form an included angle C therebetween. Herein, the included angle is 2 to 3 degrees preferably, and the revolving shaft 71 moves 2 to 3 degrees along the groove; therefore, the user can start the switch button 51 without applying a big force. The service life of the switch button 70a is prolonged.

When the battery compartment 100a is assembled, an elastic end 731 and a fixed end 730 are connected first, so that the switch button 70a and the support 30 are in zero clearance fit to facilitate manufacturing and assembling; then, the connector clip 72 of the switch button 70a is connected to the switch button 51 through the clamping hole 32, and the revolving shaft 71 is connected to the groove 310; next, the housing 10 is sleeved on the wedge block 74 and is fixed; and finally the battery is installed in the housing 10. Thus, the assembling is finished.

The present disclosure further provides an electronic cigarette. The electronic cigarette includes the above battery compartment 100a. The specific structure of the battery compartment 100a can be referred to the above embodiments. Since the electronic cigarette employs all technical schemes of the above embodiments, the electronic cigarette at least has all the beneficial effects brought by the technical schemes of the above embodiments. No further description is needed here.

The electronic cigarette further includes an atomizer, and a mouthpiece connected to the atomizer. The atomizer is connected to the battery compartment 100a. The atomizer is configured for generating an aerosol by starting ignition through the switch button 70a. The user inhales the aerosol through the mouthpiece to simulate a feeling of tobacco smoking.

In the present disclosure, the battery compartment employs an integrated semi-shaft design for the revolving shaft and the support, and realizes the function of the revolving shaft by means of the cooperation of the switch button and the support. It is neither necessary to perforate the battery compartment, nor to insert a shaft. The battery compartment of the present disclosure can realize the same function as current shaft inserted type of big-button battery compartments. The battery compartment of the present disclosure has a simple structure, saves space, is perfectly suitable for big button structures of small battery compartments, and solves the problem that electronic cigarettes need to increase the size to install the big button because of insufficient space.

The above are preferred embodiments of the present disclosure merely and are not intended to limit the patent scope of the present disclosure. Any equivalent structures made according to the description and the accompanying drawings of the present disclosure without departing from the idea of the present disclosure, or any equivalent structures applied in other relevant technical fields directly or indirectly are intended to be included in the patent protection scope of the present disclosure.

What is claimed is:

1. A battery compartment, comprising a support, a button covering the support, and a switch button accommodated in the support;
   the support defining a mounting hole and at least one locating hole; the support further defining a first through hole on two lateral surfaces thereof respectively; and the switch button directly facing the mounting hole;
   the battery compartment further comprising an elastic element and a revolving shaft; the elastic element having one end abutting against a surface of the button facing the support, and the other end passing through the mounting hole to abutting against the switch button;
   the button being provided with at least one connector assembly; the connector assembly defining a second through hole thereon; the connector assembly being configured to be inserted into the locating hole; and the revolving shaft passing through the first through hole and the second through hole.

2. The battery compartment according to claim 1, wherein the surface of the button facing the support is provided with a fixing column, and one end of the elastic element is sleeved on the fixing column.

3. The battery compartment according to claim 1, wherein the switch button comprises a base and an end cap connected to the base, and the elastic element is partially sleeved on the end cap and is abutted against the base.

4. The battery compartment according to claim 1, wherein the button is provided with a support block, the support defines an insert groove, and the support block is accommodated in the insert groove.

5. The battery compartment according to claim 1, wherein the elastic element is a spring or silicone gasket.

6. The battery compartment according to claim 1, wherein the battery compartment further comprises a PCB, the switch button is fixed on the PCB, the PCB defines a plurality of fixing holes, the support defines a plurality of connecting holes correspondingly, and a connecting piece is configured for passing through the connecting hole and the fixing hole.

7. The battery compartment according to claim 1, wherein the revolving shaft is provided with a fixing terminal at two ends thereof respectively, the fixing terminal has a cross sectional area greater than that of the first through hole, and the two fixing terminals are configured to be exposed out of the first through hole and abutted against two exterior surfaces of the support.

8. The battery compartment according to claim 6, wherein the battery compartment further comprises a battery, and the battery is configured to be connected to the PCB.

9. The battery compartment according to claim 8, wherein the PCB is further provided with a charge interface, the support further defines a recess, and the charge interface is accommodated in the recess.

10. An electronic cigarette, comprising the battery compartment according to claim 1.

11. A battery compartment, comprising a support, a housing sleeved on the support, a PCB accommodated in the support, and a switch button covering the housing; the switch button being provided with a revolving shaft and a connector clip at two ends thereof respectively, the support being provided with a connecting piece configured for accommodating the revolving shaft, and the connector clip being configured for passing through the support to connect to the PCB.

12. The battery compartment according to claim 11, wherein the connecting piece comprises a groove, and stop blocks arranged at two sides of the groove respectively; the revolving shaft is accommodated in the groove; and the stop block is configured for supporting the switch button.

13. The battery compartment according to claim 12, wherein the revolving shaft and the groove are in interference-fit connection.

14. The battery compartment according to claim 11, wherein the support defines a clamping hole, the PCB is provided with a switch button, the connector clip is configured for passing the clamping hole to be connected to the switch button.

15. The battery compartment according to claim 11, wherein the battery compartment is further provided with at least one elastic element, and the elastic element has one connected to the switch button and the other end abutted against the support.

16. The battery compartment according to claim 15, wherein the switch button is provided with a protruding part, and one end of the elastic element is sleeved on the protruding part.

17. The battery compartment according to claim 15, wherein the elastic element is a spring or silicone pad.

18. The battery compartment according to claim 11, wherein the switch button is provided with at least two wedge blocks on the end provided with the revolving shaft, and the wedge block is accommodated in the housing.

19. The battery compartment according to claim 18, wherein each wedge block comprises a first surface in connection with the housing, the switch button comprises a second surface far away from the support, and the first surface and the second surface are arranged in such a manner that an included angle is formed between the extended lines of their longitudinal sectioning lines.

\* \* \* \* \*